Figure 1:
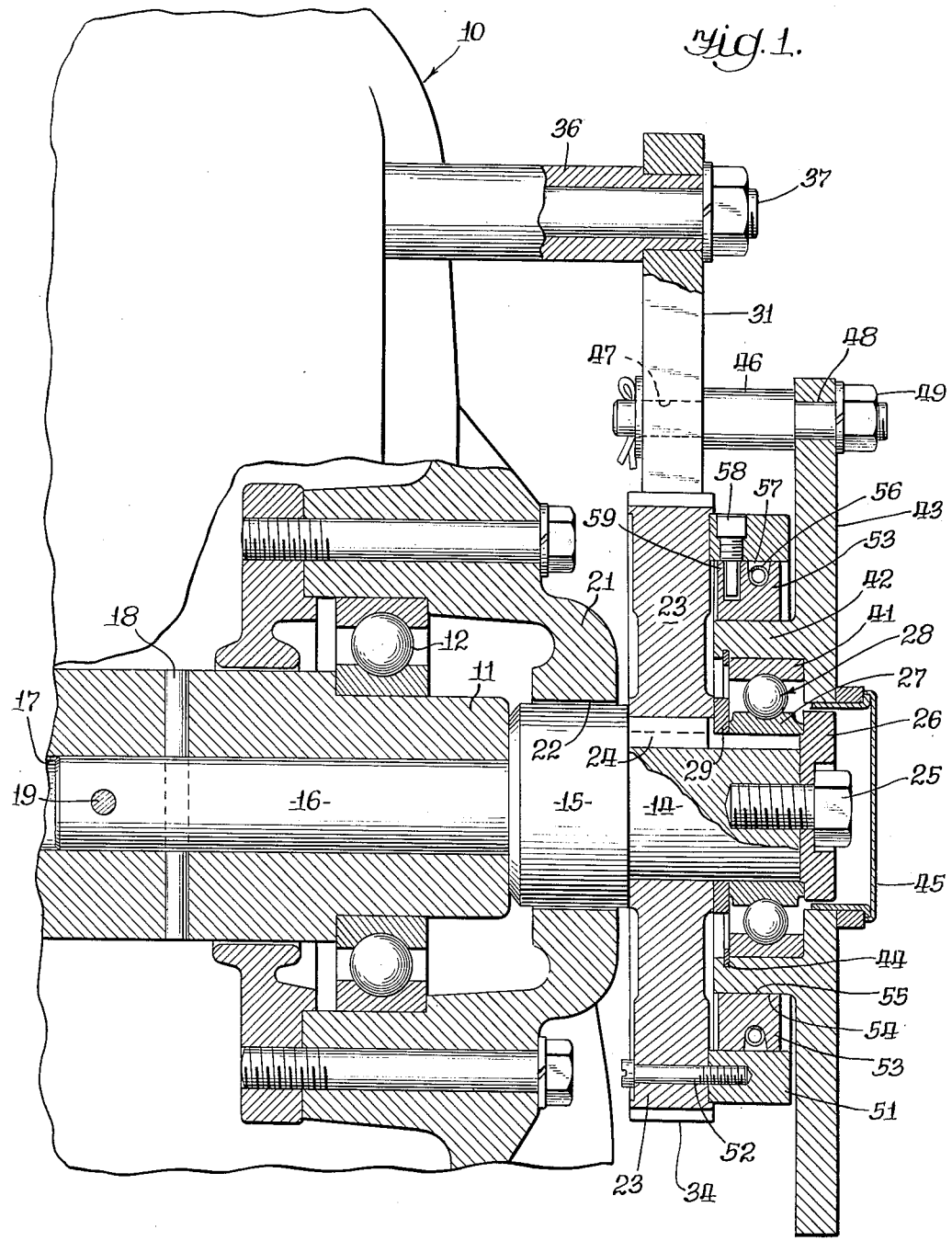

Feb. 21, 1956     D. A. SCHROCK     2,735,514
BACK-STOP MECHANISM

Filed May 27, 1952     2 Sheets-Sheet 1

INVENTOR.
Daniel A. Schrock
BY
Clarence J. Loftus
Atty.

Feb. 21, 1956 D. A. SCHROCK 2,735,514
BACK-STOP MECHANISM
Filed May 27, 1952 2 Sheets-Sheet 2

INVENTOR.
Daniel A. Schrock
BY
Clarence J. Loftus
Atty.

United States Patent Office 2,735,514
Patented Feb. 21, 1956

2,735,514

BACK-STOP MECHANISM

Daniel A. Schrock, Boise, Idaho, assignor to Idaho Sprocket and Machine Works, Boise, Idaho, a copartnership Application May 27, 1952, Serial No. 290,123

8 Claims. (Cl. 188—82.4)

This invention relates to a back-stop mechanism to prevent unwanted reverse rotation of mechanical parts such as an electric motor or other high speed rotary driving mechanism.

It is a primary object of the invention to provide a simple yet efficient back-stop mechanism which is a small, light-weight, self-contained unit, so designed that it may be easily and conveniently installed upon any conventional motor shaft or other rotary drive mechanism.

Another object is to provide a back-stop mechanism suited to either direction of rotation and reversible by merely reassembling the parts.

A further object of the invention is the provision of a back-stop mechanism wherein the principal operating parts of the device are carried entirely on a single member which may comprise a stub shaft adapted to be connected with the armature shaft of any conventional motor, so that the rotary parts of the back-stop mechanism itself are self-aligning and so that the motor shaft may be the primary mounting means for the entire back-stop unit.

Further objects of the invention are the provision of a back-stop mechanism which is long wearing, entirely quiet, and which has no appreciable friction or power consumption in use.

A still further object is to provide a back-stop device wherein the parts are so designed as to utilize power from the driving mechanism to accomplish positive and complete disengagement of the back-stop during forward motion of the driving mechanism, and to engage it instantaneously upon reverse movement to prevent any substantial reverse rotation.

The foregoing objects are accomplished in the present invention by a comparatively light, simple, self-contained unit wherein all of the rotary parts are mounted in assembled relation on a short stub shaft which may conveniently be affixed to the armature shaft of a conventional motor, for example.

The mechanism employs a ratchet and dog to prevent reverse rotation of the drive shaft but has a power operated control element arranged to apply power from the driving shaft to disengage the ratchet dog upon the initiation of forward motion and to apply the power of the drive shaft to cause engagement of the ratchet dog at the instant any reverse motion begins. A centrifugal clutch is arranged to disengage the power drive mechanism to said dog upon reaching a predetermined speed of rotation, so that the mechanism consumes no appreciable amount of power, although the ratchet dog is held in disengaged position until forward rotation of the shaft is interrupted.

Figure 2:
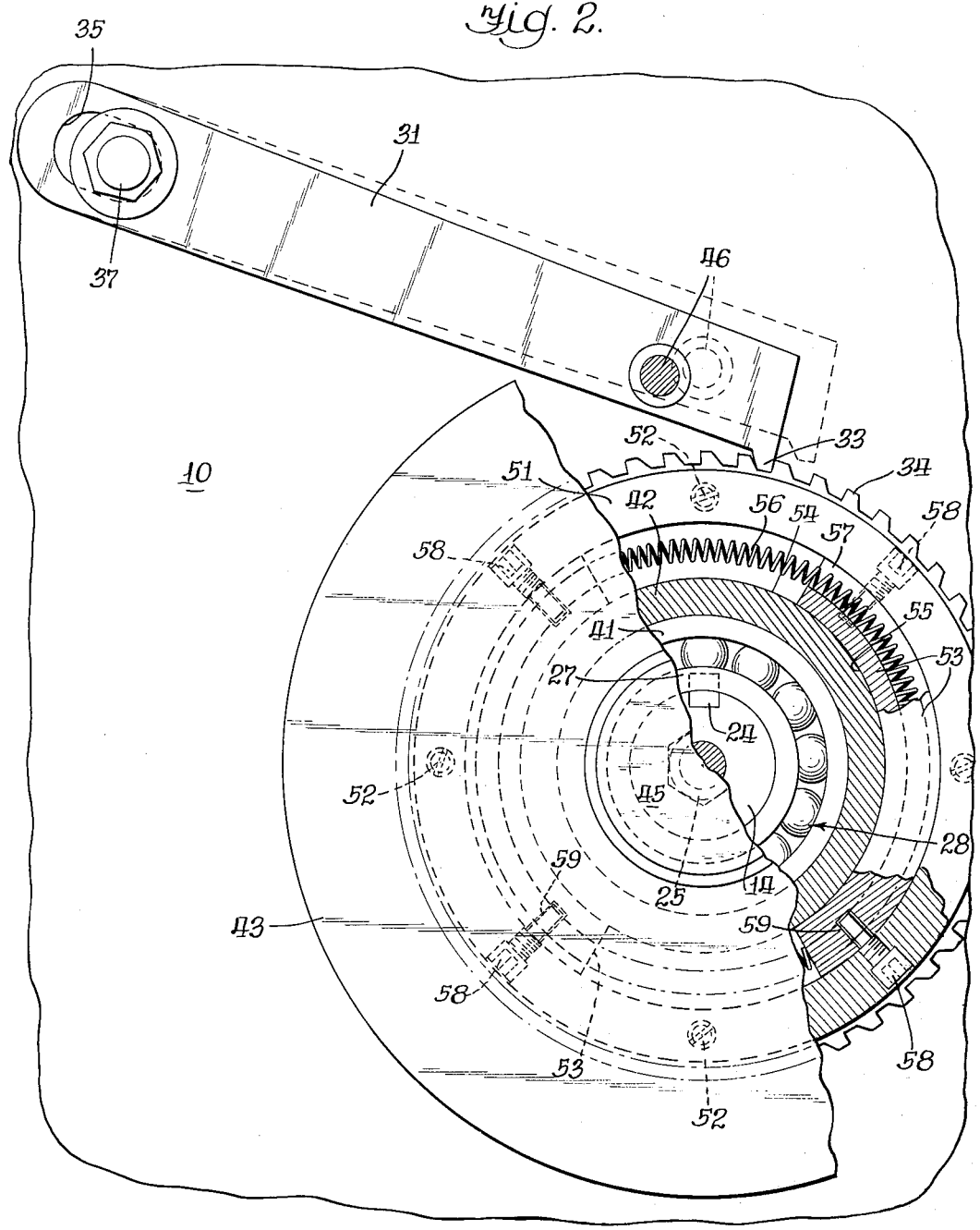

A back-stop according to this invention is adaptable to almost any rotary driving mechanism operating at reasonably high speeds, but is particularly suited to use in connection with electric motor drives, and is accordingly so illustrated in the drawings of the present specification, wherein:

Figure 1 is a central sectional view through a back-stop mechanism as contemplated by this invention, showing the mechanism mounted on an electric motor which may be of conventional design; and Figure 2 is an end elevational view of the mechanism with portions of the end plate thereof broken away to show the internal construction.

A back-stop according to the present teachings may be used in various applications, but is here illustrated in connection with a conventional electric motor 10. It is attached to the armature shaft 11 of the motor adjacent the rear bearing 12, and at the end of the motor opposite to the projecting drive shaft (not shown).

The rotating parts of the back-stop mechanism are mounted on and supported by a stub shaft 14 which includes an enlarged central portion 15 and a pilot portion 16 which extends into a central bore 17 in the armature shaft 11. The stub shaft is rigidly secured to the armature shaft by a pair of shear pins 18 and 19, and the back cap 21 of the motor housing is drilled at 22 to clear the shoulder 15 of the shaft. The stub shaft 14 carries a rotatable ratchet 23 affixed thereon by a key 24 and by a cap screw 25 and cap 26. The cap bears directly against the inner race 27 of a ball bearing 28, thus clamping the spacer 29 against the outer face of the ratchet 23.

The ratchet 23 has a stop dog 31, which, as shown in Figure 2, is in the form of a lever having at one end a tooth 33 adapted to engage the teeth 34 of the ratchet 23. The opposite end of the lever has an elongated slot 35 mounted on a stationary post 36 which is in turn secured to a fixed portion of the motor housing 10 by a screw threaded stud 37. The elongated slot 35 affords a lost motion connection between the dog 31 and the fixed mounting pivot therefor, as will later appear.

The outer race 41 of the ball bearing 28 is secured in a hub portion 42 of control plate 43 by means of a spring ring 44. Thus the control plate 43 is mounted on and supported wholly by the bearing 28 on the end of the stub shaft 14. A cap 45 may be applied to close the opening in the control plate.

The control plate 43 is mechanically joined to the dog 31 by a cross pin 46, secured in an aperture 48 in the control plate by the nut 49, and extending through and pivoted in an aperture 47 in the dog. Thus while the control plate is primarily carried by the bearing 28, the dog 31 limits its oscillating or rocking movements about the axis of the stub shaft 14. The control plate in turn functions to actuate the dog; that is, to positively engage or disengage the tooth 33 of the dog with the teeth 34 of the rachet. Counter-clockwise movement of the control plate 43 (Figure 2) is effective to shift the dog 31 toward the left, bringing it to the solid line position shown and causing the tooth 33 to engage the teeth 34 of the ratchet. Clockwise rotation moves the dog to the right as far as permitted by the length of the lost motion slot 35, and in so doing, lifts the dog tooth 33 upwardly to the disengaged position illustrated in dotted lines.

The control plate 43 is actuated by initial rotation of the ratchet 23 in either direction. The arrangement is such that initial movement of the motor shaft 11 in its forward or driving direction (clockwise, in Figure 2) will disengage the dog from the ratchet and permit free rotation thereof without contact between the teeth 33 and 34, while initial reverse rotation of only a few degrees will engage the teeth 33, 34 almost instantaneously and lock the ratchet 23 and the motor shaft 11 against further reverse movement.

The control plate 43 is powered by a centrifugal clutch housed within an annular ring 51 mounted on the outer face of the ratchet 23 by a plurality of machine screws 52. The ring 51 surrounds and encloses a pair of arcuately shaped, weighted bronze clutch shoes 53 (Figure 2) having inside friction surfaces 54 arranged to bear upon the outer cylindrical surfaces 55 of the control plate hub 42. The shoes 53 are urged inwardly against the hub of the control plate by an annular spring 56 encircling both shoes and seated in a groove or channel 57 cut in their outer surfaces. The shoes are also secured to the outer ring or housing 51 by opposite pairs of anchor pins 58 threaded through the ring 51 and having reduced end portions loosely fitting into openings 59 drilled inwardly from the outer arcuate faces of each of the shoes.

In operation, the back-stop here disclosed prevents any substantial reverse movement of the driving shaft of the motor in a positive and dependable manner, yet is so designed and constructed that it does not interfere with the free forward rotation of the shaft and accomplishes its function without any perceptible degree of friction or power consumption, and without appreciable wear on the operating parts.

These objects are accomplished primarily by reason of the mechanical design of the mechanism whereby the dog is positively engaged and disengaged, yet is held clear of the ratchet during all normal forward rotation of the motor. Similarly, the clutch functions only on the initial movement of the drive shaft, and is held in frictionless disengaged position as soon as the mechanism reaches operating speed. Thus, all of the operating parts of the back-stop mechanism are normally idle and function only upon the instant of initial forward or reverse motion of the motor shaft. This construction obviously avoids unnecessary wear on the component parts of the mechanism which makes for long life, silence and trouble-free operation.

It is also to be noted that the mechanism is of compact, unitary construction and so arranged that it may be conveniently and easily attached to almost any type of motor or other rotating mechanism. Moreover, a back-stop mechanism as here disclosed may be used for shafts of clockwise or counter-clockwise drive without any substitution of parts whatsoever. This is accomplished by merely reversing the position of the ratchet 23 on the stub shaft 14, and reversing the position of the dog 31 from left to right as viewed in Figure 2.

From the foregoing it is believed apparent that the back-stop construction here disclosed accomplishes important practical advantages over structures heretofore known and results in mechanism which is small, of light weight, easily installed, relatively inexpensive, yet long wearing and entirely positive in action.

Having thus described my invention, what I claim as new and desire to secure by United States Letters Patent is:

1. A back-stop mechanism comprising a rotatable shaft having a pilot portion at one end and a bearing at the opposite end, with a ratchet affixed to an intermediate portion of the shaft and rotatable therewith, and a dog comprising a pivoted lever having at one end a tooth engaging the ratchet and at its other end having a lost motion connection with a fixed mounting pivot; in combination with an oscillating control plate having a central hub mounted on the bearing at the end of the shaft and a pin interconnecting the control plate and the dog to limit the oscillating movement of the control plate on the shaft and to move the dog in response to movement of the control plate; and a clutch interconnecting said ratchet and said control plate and comprising a circular ring on one side of the ratchet overhanging the hub of the control plate, with clutch shoes loosely secured within said ring and between the ratchet and the control plate; said clutch shoes having friction surfaces engaging coacting friction surfaces on the hub of the control plate to move the control plate in response to movement of the ratchet, and having weighted portions to disengage said surfaces upon rapid rotation of the ratchet.

2. A back-stop mechanism comprising a rotatable shaft having a pilot portion at one end and a bearing at the opposite end, with a ratchet affixed to an intermediate portion of the shaft and rotatable therewith, and a dog comprising a pivoted lever having at one end a tooth engaging the ratchet and at its other end having a lost motion connection with a fixed mounting pivot; in combination with an oscillating control plate having a central hub mounted on the bearing at the end of the shaft and a pin interconnecting the control plate and the dog to limit the oscillating movement of the control plate on the shaft and to move the dog in response to movement of the control plate; and a centrifugal release clutch interconnecting the ratchet and the control plate to move the control plate in response to movement of the ratchet.

3. A back-stop mechanism comprising a rotatable shaft having a pilot portion at one end and a bearing at the opposite end, with a ratchet affixed to an intermediate portion of the shaft and rotatable therewith, and a dog comprising a pivoted lever having at one end a tooth engaging the ratchet and at its other end having a lost motion connection with a fixed mounting pivot; in combination with an oscillating control plate having a central hub mounted on the bearing at the end of the shaft and a pin interconnecting the control plate and the dog to limit the oscillating movement of the control plate on the shaft and to move the dog into or out of engagement with the ratchet in response to movement of the control plate; and a centrifugal release clutch comprising coacting friction surfaces interconnecting the ratchet and the control plate, with spring means urging said friction surfaces into engagement with each other to move the control plate in response to movement of the ratchet, and centrifugal weights to disengage said surfaces upon rapid rotation of the ratchet.

4. A back-stop mechanism comprising a rotatable ratchet and a dog therefor comprising a pivoted lever, in combination with an oscillating control member adjacent to and concentric with the ratchet, and a centrifugal release clutch comprising disengageable friction surfaces interconnecting the ratchet and the control member, with spring means urging said friction surfaces into engagement with each other, and means to disengage said surfaces upon rapid rotation of the ratchet; together with a mechanical operating connection interconnecting the control member and the dog to move the dog in response to initial rotary movement of the ratchet.

5. A back-stop mechanism comprising a rotatable ratchet and a dog therefor having a lost motion connection with a fixed member, in combination with an oscillating control member adjacent to and concentric with the ratchet, and a clutch comprising disengageable friction surfaces interconnecting the ratchet and the control member, with centrifugal means to disengage said surfaces upon rapid rotation of the ratchet; together with a mechanical operating connection interconnecting the control member and the dog to move the dog into engagement with the ratchet in response to initial rotary movement of the ratchet in one direction, and to disengage the dog from the ratchet in response to initial rotary movement of the ratchet in the opposite direction.

6. A back-stop mechanism comprising a rotatable ratchet and a dog therefor; in combination with a shiftable control plate pivotally mounted adjacent the ratchet and having a hub projecting toward the ratchet with annular friction surfaces on the hub and concentric with the axis of rotation of the ratchet; a clutch interconnecting said ratchet and control plate and comprising a circular ring on one side of the ratchet overhanging said friction surfaces, with arcuate clutch shoes loosely secured within the ring; the clutch shoes having inside friction surfaces and spring means urging said surfaces into engagement with the friction surfaces on the hub of the control plate and having weighted portions to disengage said surfaces upon rapid rotation of the ratchet; together with an operating connection extending between the control plate and the ratchet dog.

7. A back-stop mechanism comprising a rotatable ratchet and a dog therefor; in combination with a shiftable control plate pivotally mounted adjacent the ratchet and having annular friction surfaces concentric with the axis of rotation of the ratchet, and a clutch comprising clutch shoes loosely secured between the ratchet and the control plate; with spring means urging said clutch shoes into engagement with the friction surfaces of the control plate and centrifugal means to move said shoes and disengage said surfaces upon rapid rotation of the ratchet; together with an operating connection interconnecting the control plate and the ratchet dog.

8. A back-stop mechanism comprising a rotatable ratchet and a dog therefor; in combination with a shiftable control member driven by said ratchet through a centrifugal release clutch comprising disengageable friction surfaces, means urging said surfaces into engagement, and clutch release means responsive to rapid rotation of the ratchet; together with an operating connection extending between the control member and the ratchet dog.

References Cited in the file of this patent

UNITED STATES PATENTS

| | | |
|---|---|---|
| 1,948,082 | Stangeland | Feb. 20, 1934 |
| 2,001,810 | Zwald | May 21, 1935 |
| 2,341,753 | Zwald | Feb. 15, 1944 |